US011256626B2

(12) United States Patent
Heirman et al.

(10) Patent No.: US 11,256,626 B2
(45) Date of Patent: *Feb. 22, 2022

(54) APPARATUS, METHOD, AND SYSTEM FOR ENHANCED DATA PREFETCHING BASED ON NON-UNIFORM MEMORY ACCESS (NUMA) CHARACTERISTICS

(71) Applicant: Intel Corporation, Santa Clara, CA (US)

(72) Inventors: Wim Heirman, Ghent (BE); Ibrahim Hur, Portland, OR (US); Ugonna Echeruo, Hillsboro, OR (US); Stijn Eyerman, Evergem (BE); Kristof Du Bois, Aalst (BE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,833

(22) Filed: Apr. 1, 2020

(65) Prior Publication Data
US 2020/0233806 A1 Jul. 23, 2020

Related U.S. Application Data

(63) Continuation of application No. 16/024,527, filed on Jun. 29, 2018, now Pat. No. 10,621,099.

(51) Int. Cl.
*G06F 12/08* (2016.01)
*G06F 12/0862* (2016.01)

(52) U.S. Cl.
CPC .. *G06F 12/0862* (2013.01); *G06F 2212/1024* (2013.01); *G06F 2212/271* (2013.01); *G06F 2212/602* (2013.01)

(58) Field of Classification Search
None
See application file for complete search history.

(56) References Cited

U.S. PATENT DOCUMENTS

2012/0317364 A1  12/2012  Loh
2013/0132680 A1   5/2013  Peleg
(Continued)

OTHER PUBLICATIONS

European Search Report and Search Opinion, EP App. No 19176631.0, dated Dec. 2, 2019, 7 pages.
(Continued)

*Primary Examiner* — Tracy C Chan
(74) *Attorney, Agent, or Firm* — Nicholson De Vos Webster & Elliott LLP

(57) ABSTRACT

Apparatus, method, and system for enhancing data prefetching based on non-uniform memory access (NUMA) characteristics are described herein. An apparatus embodiment includes a system memory, a cache, and a prefetcher. The system memory includes multiple memory regions, at least some of which are associated with different NUMA characteristic (access latency, bandwidth, etc.) than others. Each region is associated with its own set of prefetch parameters that are set in accordance to their respective NUMA characteristics. The prefetcher monitors data accesses to the cache and generates one or more prefetch requests to fetch data from the system memory to the cache based on the monitored data accesses and the set of prefetch parameters associated with the memory region from which data is to be fetched. The set of prefetcher parameters may include prefetch distance, training-to-stable threshold, and throttle threshold.

22 Claims, 17 Drawing Sheets

(56) References Cited

U.S. PATENT DOCUMENTS

2016/0019155 A1* 1/2016 Radhakrishnan ... G06F 12/0862
                                                     711/137
2016/0188477 A1   6/2016 Choi et al.
2016/0357677 A1* 12/2016 Hooker .............. G06F 12/0862
2016/0371187 A1* 12/2016 Roberts ............. G06F 12/0638
2017/0031823 A1*  2/2017 Ross ................. G06F 12/0862

OTHER PUBLICATIONS

Non-Final Office Action, U.S. Appl. No. 16/024,527, dated Aug. 22, 2019, 15 pages.
Notice of Allowance, U.S. Appl. No. 16/024,527, dated Dec. 13, 2019, 8 pages.

* cited by examiner

ACCESS STREAM 510

| | DEMAND ACCESS | | | REGION 512 $S_{512} = 3, D_{512} = 3$ | | |
|---|---|---|---|---|---|---|
| TIME | HOME LINE | STRIDE | HITS | STATE | LAST PREFETCH | PREFETCHE(S) ISSUED |
| $T_0$ | 1000 | ? | 0 | SEARCHING | - | - |
| $T_0+1$ | 1001 | 1 | 1 | TRAINING | - | - |
| $T_0+2$ | 1002 | 1 | 2 | TRAINING | - | - |
| $T_0+3$ | 1003 | 1 | 3 | STABLE | 1006 | 1004, 1005, 1006 |
| $T_0+4$ | 1004 | 1 | 4 | STABLE | 1007 | 1007 |
| $T_0+5$ | 1005 | 1 | 5 | STABLE | 1008 | 1008 |
| $T_0+6$ | 1006 | 1 | 6 | STABLE | 1009 | 1009 |
| $T_0+7$ | 1007 | 1 | 7 | STABLE | 1010 | 1010 |
| $T_0+8$ | 1008 | 1 | 8 | STABLE | 1011 | 1011 |

FIG. 5A

ACCESS STREAM 520

| TIME | DEMAND ACCESS HOME LINE | STRIDE | HITS | REGION 522 $S_{522}=4, D_{522}=5$ STATE | LAST PREFETCH | PREFETCHE(S) ISSUED |
|---|---|---|---|---|---|---|
| $T_1$ | 2000 | ? | 0 | SEARCHING | - | - |
| $T_1+1$ | 2002 | 2 | 1 | TRAINING | - | - |
| $T_1+2$ | 2004 | 2 | 2 | TRAINING | - | - |
| $T_1+3$ | 2006 | 2 | 3 | TRAINING | - | - |
| $T_1+4$ | 2008 | 2 | 4 | STABLE | 2018 | 2010, 2012, ... 2018 |
| $T_1+5$ | 2010 | 2 | 5 | STABLE | 2020 | 2020 |
| $T_1+6$ | 2012 | 2 | 6 | STABLE | 2022 | 2022 |
| $T_1+7$ | 2014 | 2 | 7 | STABLE | 2024 | 2024 |
| $T_1+8$ | 2016 | 2 | 8 | STABLE | 2026 | 2026 |

FIG. 5B

ACCESS STREAM 600

| DEMAND ACCESS | | | | REGION 612 (EVEN LINES) $S_{612} = 3, D_{612} = 3$ | | REGION 614 (ODD LINES) $S_{614} = 4, D_{614} = 5$ | | PREFETCHE(S) ISSUED |
|---|---|---|---|---|---|---|---|---|
| TIME | HOME LINE | STRIDE | HITS | STATE | LAST PREFETCH | STATE | LAST PREFETCH | |
| $T_3$ | 3000 | ? | 0 | SEARCHING | - | SEARCHING | - | - |
| $T_3+1$ | 3001 | 1 | 1 | TRAINING | - | TRAINING | - | - |
| $T_3+2$ | 3002 | 1 | 2 | TRAINING | - | TRAINING | - | - |
| $T_3+3$ | 3003 | 1 | 3 | STABLE | 3006 | TRAINING | - | 3004, 3006 |
| $T_3+4$ | 3004 | 1 | 4 | STABLE | 3007 | TRAINING | - | - |
| $T_3+5$ | 3005 | 1 | 5 | STABLE | 3008 | STABLE | 3010 | 3008, 3007, 3009 |
| $T_3+6$ | 3006 | 1 | 6 | STABLE | 3009 | STABLE | 3011 | 3011 |
| $T_3+7$ | 3007 | 1 | 7 | STABLE | 3010 | STABLE | 3012 | 3010 |
| $T_3+8$ | 3008 | 1 | 8 | STABLE | 3011 | STABLE | 3013 | 3013 |

FIG. 6

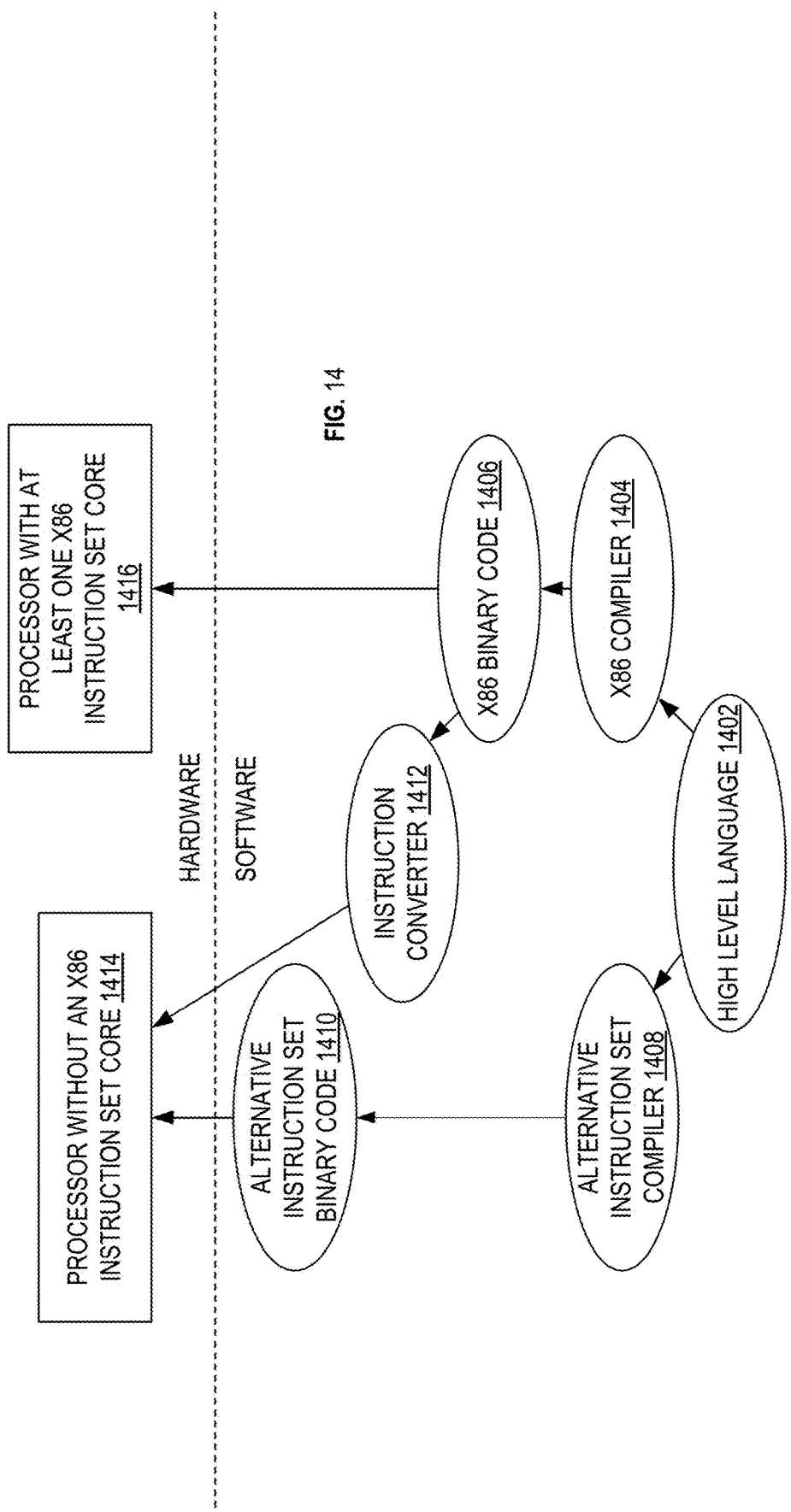

APPARATUS, METHOD, AND SYSTEM FOR ENHANCED DATA PREFETCHING BASED ON NON-UNIFORM MEMORY ACCESS (NUMA) CHARACTERISTICS

TECHNICAL FIELD

Embodiments of the invention described herein relate generally to the field of data prefetching logic and architecture in a computer processing system. In particular, the disclosure relates to enhanced data prefetching based on non-uniform memory access characteristics associated with different memory types and memory locations.

BACKGROUND ART

Cache prefetching is a technique employed by computer processors to increase performance by preemptively fetching instructions and data from relatively slower storage locations (e.g., system memory) to faster storage locations (e.g., cache) before they are requested by the processors for execution. Prefetching enables portions of the memory access latency to be overlapped which increases processor performance by reducing the overall data access time. The factors to consider when designing or implementing a prefetcher include accuracy and timeliness. To be accurate means making good predictions about what is likely to be requested and therefore less resources are wasted on bad prefetches. An accurate prefetcher, however, typically utilizes algorithms that are relatively conservative and time-consuming. As such, prefetchers that are accurate tend to be slow and less aggressive in making prefetch predictions. On the other hand, a prefetcher that is timely, such as one that aggressively prefetches data ahead of a processor's access stream, tends to be less accurate because events are harder to predict the further they are out in time. Finding the right balance between accuracy and timeliness has long been the struggle plaquing engineers when trying to implement the "perfect" prefetching behavior.

BRIEF DESCRIPTION OF THE DRAWINGS

The invention may best be understood by referring to the following description and accompanying drawings that are used to illustrate embodiments of the invention. In the drawings:

FIG. 5A illustrates the states kept by a prefetcher through time for an access streams that spans a single memory region according to an embodiment;

FIG. 5B illustrates the states kept by the prefetcher through time for another access streams that spans a different memory region according to an embodiment;

FIG. 6 illustrates the states kept by the prefetcher through time for an access streams that spans more than one memory regions according to embodiments of the present invention;

FIG. 14 illustrates a block diagram contrasting the use of a software instruction converter to convert binary instructions in a source instruction set to binary instructions in a target instruction set according to embodiments of the invention.

DETAILED DESCRIPTION

Figure 1A:
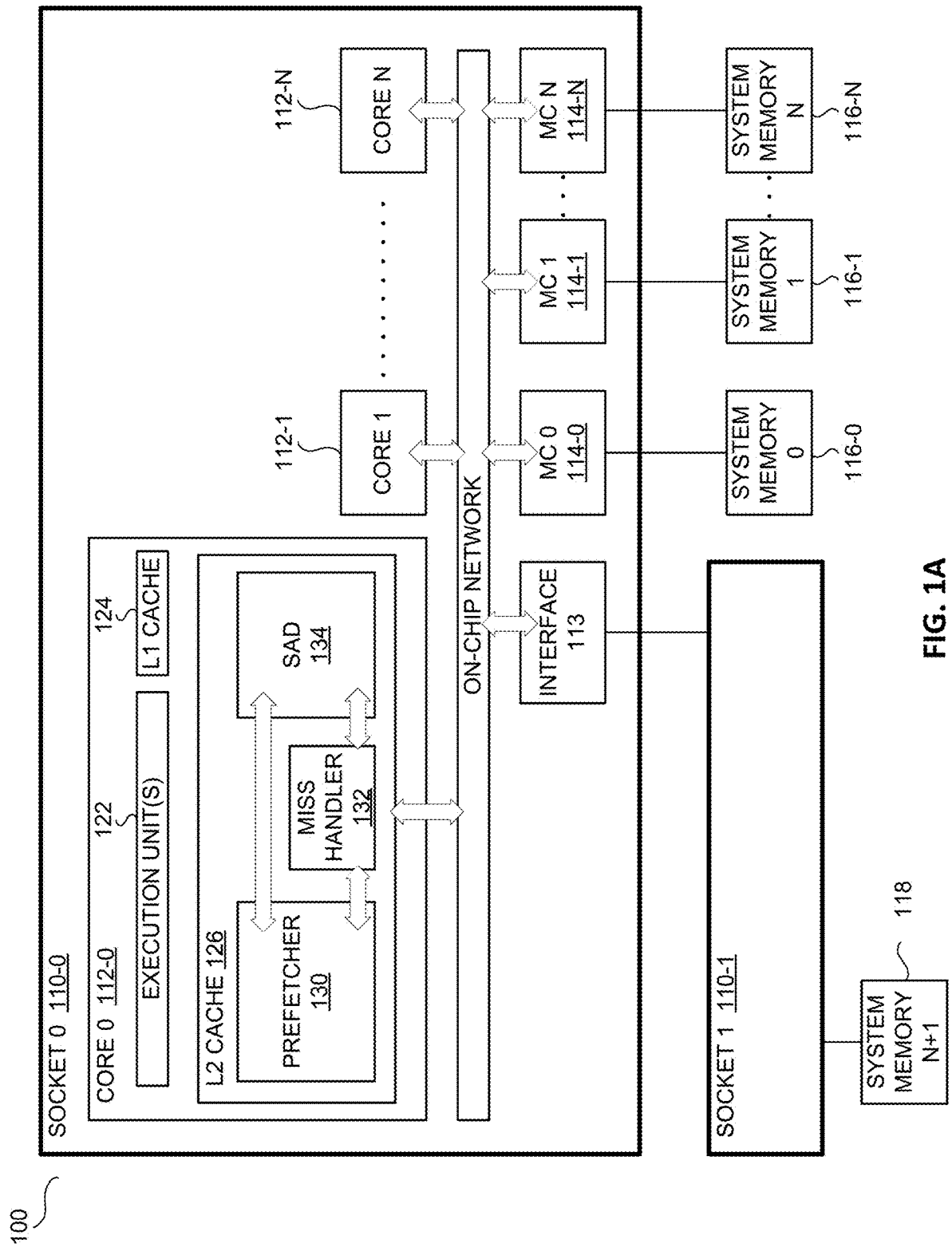
FIG. 1A is a block diagram illustrating an embodiment of the system on which aspects of the present invention may be implemented.

Embodiments of apparatus, method, and system for enhanced data prefetching based on non-uniform memory access characteristics are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Today's shared-memory computer system have increasingly non-uniform memory access (NUMA) characteristics. This means that while a processor core can access all of the memory addresses in a single memory address space, different addresses have associated with them different access latency and/or bandwidth characteristics. Current prefetchers, however, are generally not aware of or have no visibility to these NUMA characteristics. As such, hardware prefetchers today are often not optimally configured for prefetching different addresses in the address space. Instead, they typically settle for settings that assume uniform access characteristics across the address space. A better approach would be to enable the prefetchers to adjust their prefetching behavior for different memory addresses based on the NUMA characteristics associated with each of these addresses.

Aspects of the present invention are directed to exposing a map of the system memory to hardware prefetchers and extending the prefetcher algorithm to support different prefetching behaviors within a single prefetcher. In one embodiment, a hardware prefetcher is made aware of the non-uniform memory access characteristics associated with different addresses within a system memory address space which, in turn, enables the hardware prefetcher to adjust its prefetching behavior (aggressiveness, accuracy, etc.) in accordance to the different NUMA characteristics. Specifically, the prefetcher may set different prefetching parameters when working with different addresses. For example, when prefetching data from memory addresses that are mapped to local memory (e.g., memory located in the same chip/socket as the prefetcher), the prefetcher behavior can be made more aggressive. Conversely, when prefetching data from addresses that are mapped remote memory (e.g., memory on a different chip/socket as the prefetcher), the prefetcher behavior should be made more conservative. In one embodiment, different memory addresses may be associated with different prefetching parameters, depending on the location and/or type of memory the addresses are mapped to. By being able to adapt and adjust prefetcher behavior for different memory addresses instead of settling for a fixed one-size-fits-all approach across the entire memory address space, prefetchers can be made more efficient and thereby improves processor performance.

Figure 1B:
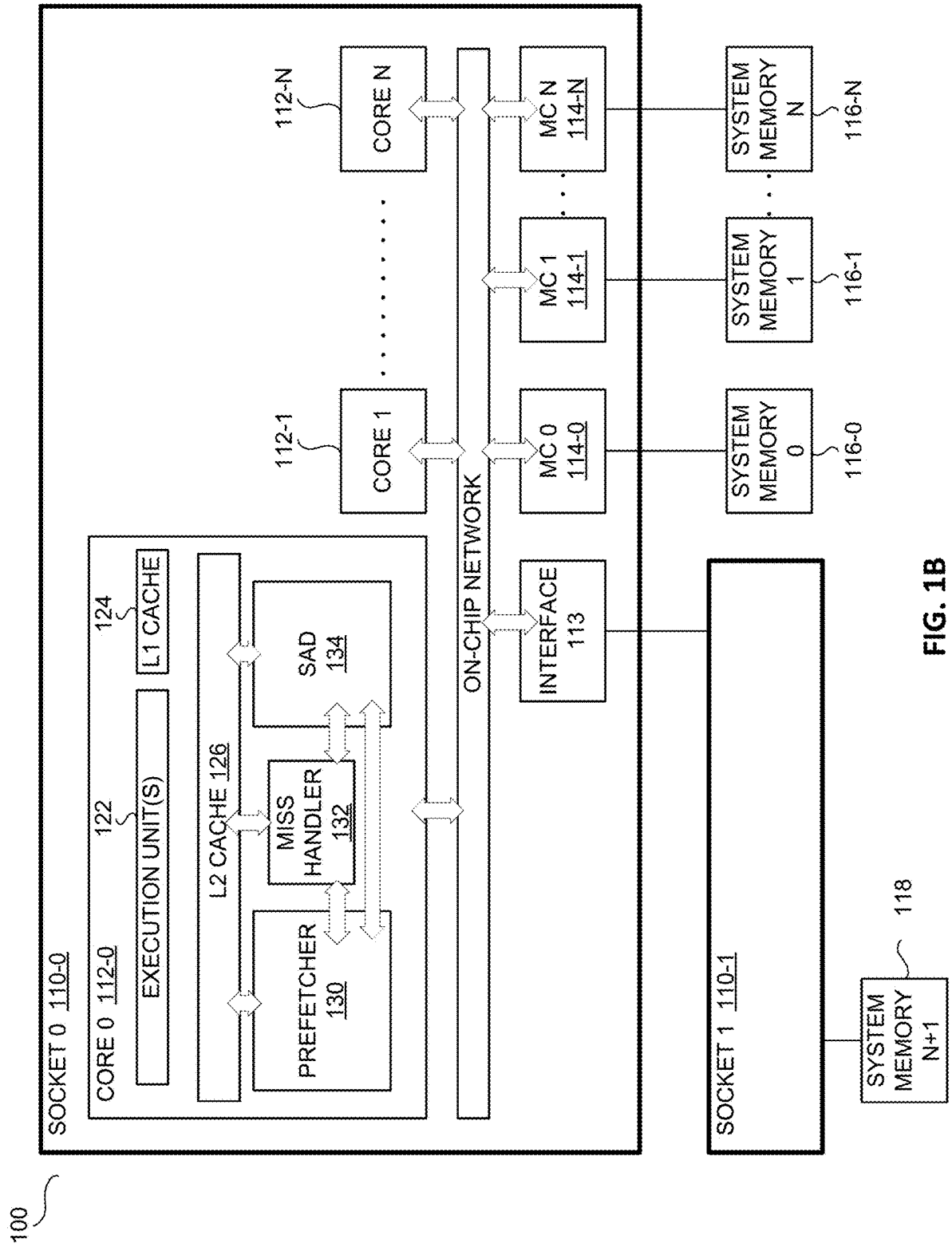
FIG. 1B is a block diagram illustrating another embodiment of the system on which aspects of the present invention may be implemented.
Figure 1C:
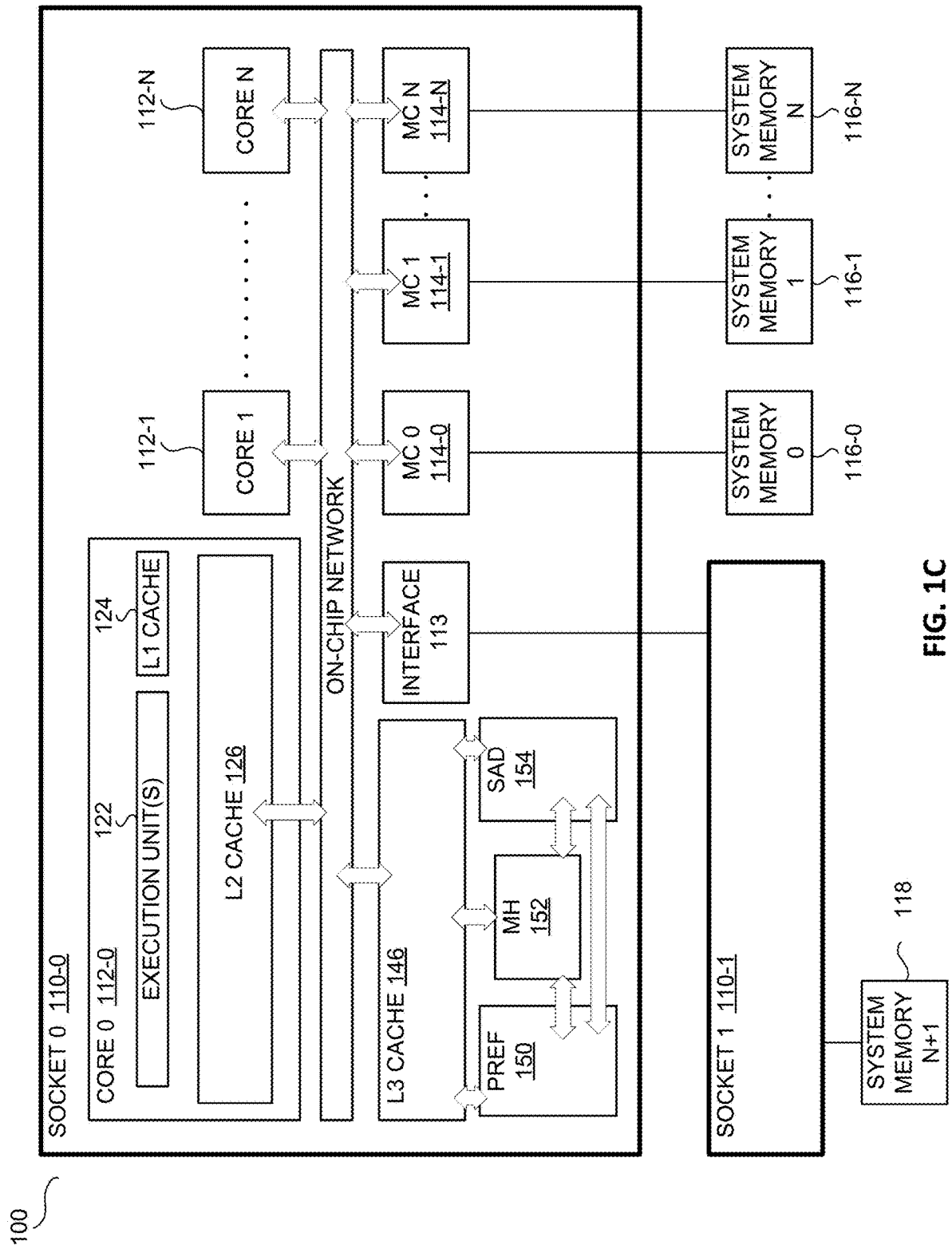
FIG. 1C is a block diagram illustrating yet another embodiment of the system on which aspects of the present invention may be implemented.

FIG. 1A is a block diagram illustrating an embodiment of an exemplary system on which aspects of the present invention may be implemented. Some details of system 100 are omitted to avoid obscuring the underlying aspects of the invention. System 100 includes one or more processor sockets 110. At least some of the processor sockets 110 are communicatively coupled to one or more system memory modules 116 or 118. While the details of a socket 0 110-0 are illustrated in FIG. 1 for simplicity, it will be understood, however, that each of the other processor sockets (e.g., socket 1 110-1) may have the same, or similar, set of logic, components, circuitry, and/or configuration as socket 0. In particular, socket 0 110-0 includes one or more cores 112. Each of the cores 112 further includes one or more execution units 122, a level 1 (L1) cache 124, and a level 2 (L2) cache 126. In some embodiments, the L1 cache is comprised of an instruction cache for storing instructions and a data cache for storing the data needed for executing the instructions. While not illustrated in FIG. 1A, Socket 0 110-0 may further include a level 3 (L3) cache or last level cache (LLC) that is communicatively coupled to, and shared by, all the cores 112. In some embodiments, the L3/LLC may be physically distributed and logically shared among the cores 112. Each of L1, L2/MLC, and L3/LLC caches, according to an embodiment, is managed by a respective cache agent or controller and is usable for caching instructions and data. As shown, the L2 cache 126 further includes, or is associated with, a prefetcher 130, a miss handler 132 and a system address decoder (SAD) 134. While these components are shown as part of the L2 cache 126, some or all of them may be implemented as independent components that are separate from the L2 cache, such as the system embodiment shown in FIG. 1B. Furthermore, one skilled in the art will appreciate that the L1 and L3 cache may also include, or be associated with, their own respective prefetcher, miss handler, and SAD for performing similar functions as those of the L2 cache. FIG. 1C illustrates a system embodiment in which the L3 cache 146 is associated with its own prefetcher 150, miss handler 152, and SAD 154.

Still referring to FIG. 1A, according to one embodiment, the prefetcher 130 receives from the miss handler 132 information about data requests that misses the L2 cache. Utilizing that information, the prefetcher 130 tracks the access streams and tries to prefetch data that may be requested in the future. To determine the appropriate prefetching parameters or settings for the tracked access stream, the prefetcher 130 may query the SAD 134 for information about the memory addresses that are within the stream window of the access stream. The SAD 134 may provide information on address translations, as well as information on the memory type, memory region, and/or NUMA characteristics associated with the memory addresses.

Figure 2:
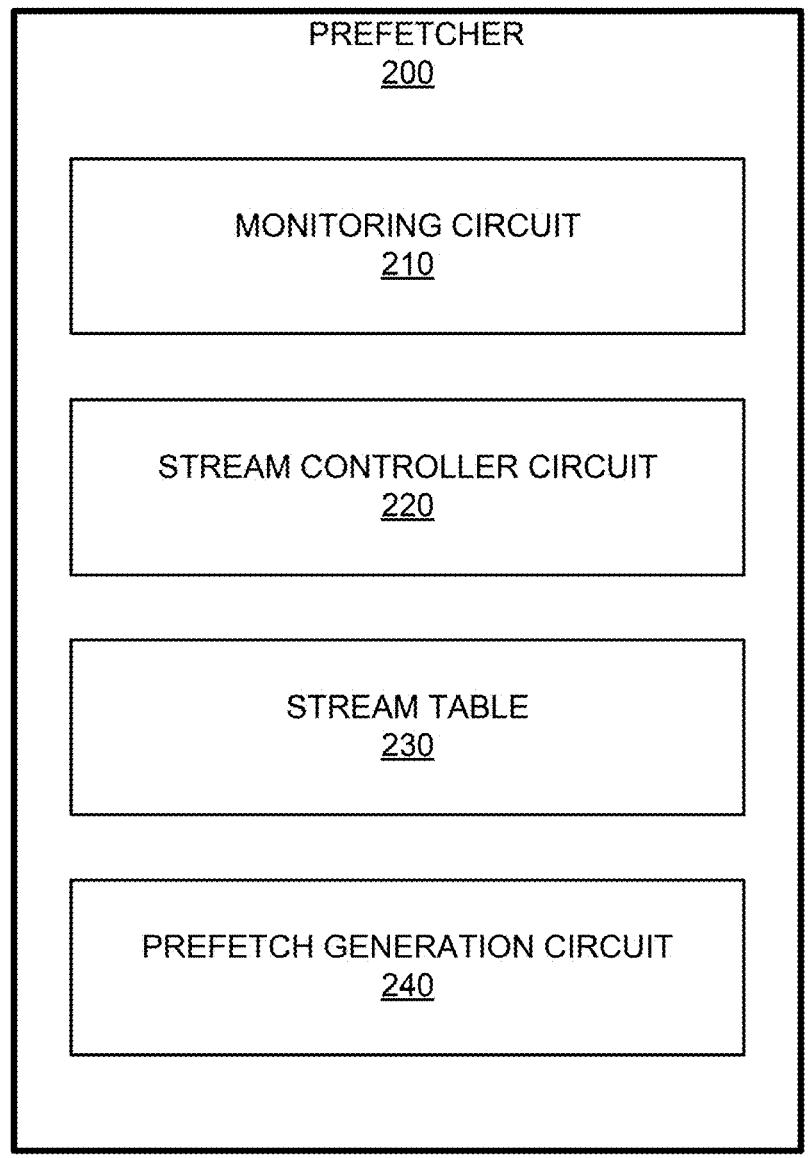
FIG. 2 is a block diagram illustrating an embodiment of a prefetcher on which aspects of the present invention may be implemented.

FIG. 2 is a block diagram illustrating an embodiment of a prefetcher. Prefetcher 200 includes monitoring circuit, 210, stream controller circuit 220, stream table 230, and prefetch generation circuit 240. The monitoring circuit 210 monitors accesses to an associated cache (e.g., L2 cache 126), including demand accesses and missed accesses. Based on these monitored accesses, the stream controller circuit 220 may generate new streams and/or update existing streams, which are used for making prefetch decisions. In addition to storing these streams, the stream table 230 may also store a set of prefetch parameters for each respective stream. The prefetch generation circuit 240, in turn, issues prefetch requests to the system memory based on the streams and their associated prefetch parameters.

Referring back to FIG. 1A, socket 0 110-0 may further include one or more memory controllers 114. Each of the memory controllers 114 is communicatively coupled to a corresponding system memory module 116. Each of the cores 112 may communicate (read/write) to the any of the system memory modules 116 through the corresponding memory controller 114. Each of the cores 112 may also communicate to system memory modules located in other sockets (e.g., system memory N+1 118) through an inter-socket communication interface 113. Since system memory modules 116 are located closer to the prefetcher 130 than system memory module 118, they may be referred to as local memory while system memory module 118 may be considered as remote memory. System memory modules 116 and 118 may be of any memory types or technologies, including traditional DRAM and non-volatile memory (NVM). Different system memory modules may also be associated with different access characteristics (e.g., accesses to the NVM may have higher latency and lower bandwidth than accesses to the DRAM).

According to an embodiment, all system memory modules 116 and 118 in system 100 are accessible in a single global shared memory address space. To access an address mapped to local memory 116, a core 112 utilizes the high-bandwidth, low-latency on-chip connection to the memory controller 114. On the other hand, to access addresses mapped to remote memory modules 118, the core 112 exchanges messages over an inter-socket communication interface/fabric 113, which is typically associated with high-latency and low-bandwidth.

To map the global memory address space onto different memory modules, and thereby onto their respective memory controllers, a form of interleaving is typically used. Specifically, the global memory address space is divided into identically-sized regions such that each of the regions contains a contiguous block of physical memory addresses. Each region is assigned to a memory controller in an interleaved fashion. For example, in the case of two memory controllers, one memory controller may be assigned all of the odd-numbered regions while the other memory controller is assigned all of the even-numbered regions. A commonly used interleaving factor (i.e. size of the region) is one cache line (e.g., 64 bytes). By using a small interleaving factor (e.g., one cache line), linear data access streams can be spread out across different memory controllers to maximize bandwidth. On the other hand, by using a large interleaving factor, such as one that equals the maximum per-controller memory capacity, a memory module that is attached to a single controller can be map to a single consecutive memory address range. This, in turn, can be exploited by the operating system to allocate memory addresses to a memory controller that is local to the expected users of these memory addresses to minimize remote access traffic.

Figure 3:
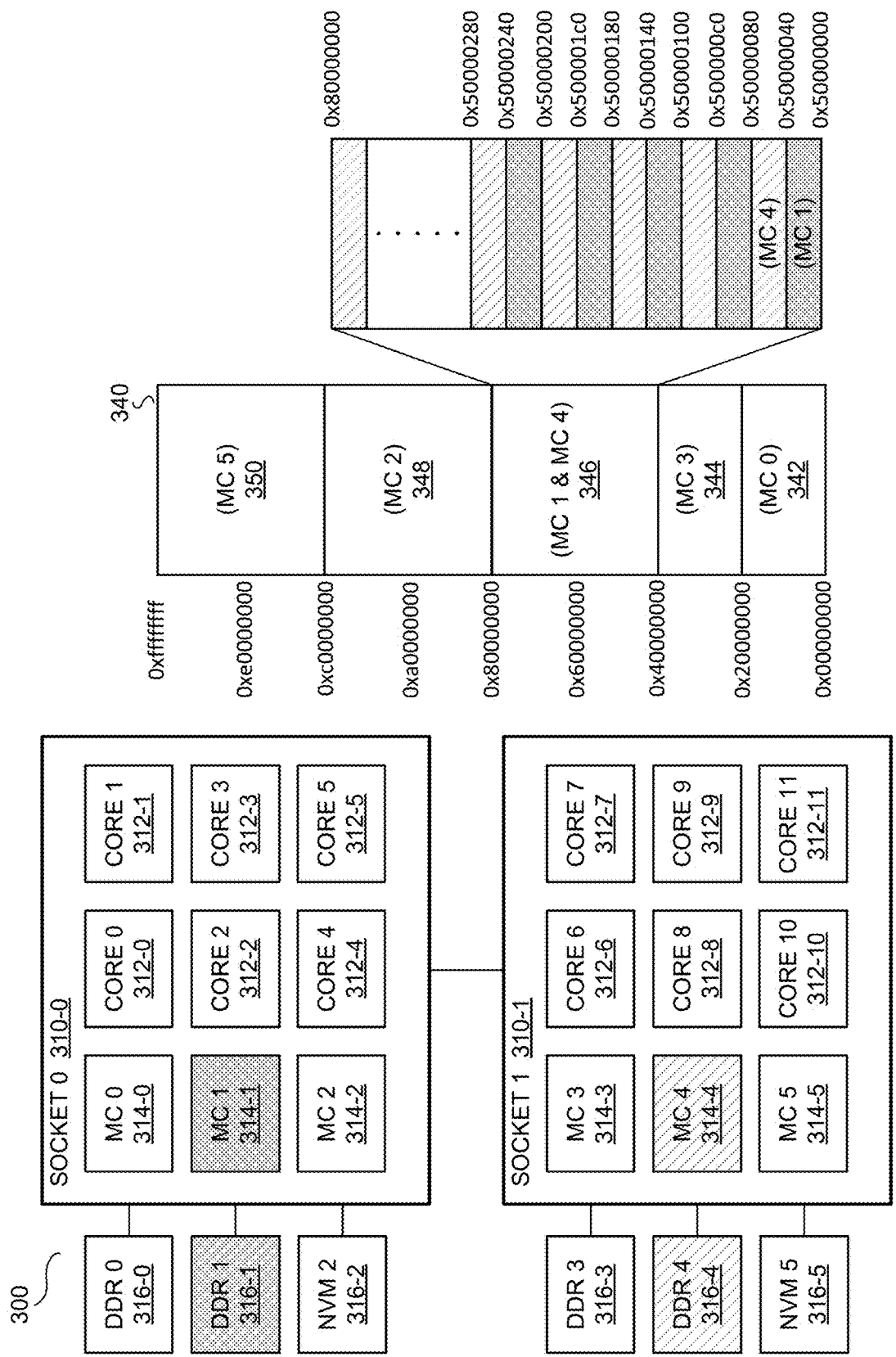
FIG. 3 is illustrates an exemplary mapping of a system's memory address space according to an embodiment of the present invention.

An exemplary mapping of a system's memory address space, in accordance to an embodiment of the present invention, is illustrated in FIG. 3. System 300 is a dual-socket system that includes socket 310-0 and socket 310-1. Each of the sockets includes a plurality of cores 312 as well as a plurality memory controllers 314. Each of the memory controllers 314 corresponds to a different system memory module 316 and is responsible for accesses to and from the corresponding system memory module. For instance, memory controller 314-0 corresponds to a DDR-type memory module 316-0, memory controller 314-1 corresponds to a different DDR-type memory module 316-1, memory controller 314-2 corresponds to an NVM-type memory module 314-2, and so on. All system memory modules are accessible through a single global memory address space 140 ranging from 0x00000000 to 0xffffffff. Specifically, a first portion 342 of the memory address space, which ranges from 0x00000000 to 0x1ffffff, is mapped to memory controller 314-0 for accessing system memory module 316-0. A second portion 344, which ranges from 0x2000000 to 0x3ffffff, is mapped to memory controller 314-3 for accessing system memory module 316-3. A third portion 346 is split (interleaved) between memory controllers 314-1 and 314-4. In addition, portion 346 is further divided into equal cache-line-sized (64 bytes) sub-portions that are interleaved between memory controllers 314-1 and 314-4. As illustrated, the darker-shaded portions contain memory addresses that are assigned to memory controller 314-1 and the lighter-shaded portions contain memory addresses that are assigned to memory controller 314-4. The forth 348 and fifth 350 portions of system memory address space 340 are mapped to memory controllers 314-2 and 314-5, respectively, for accessing system memory modules 316-2 and 316-5.

Since the system memory address space may be mapped to different memory controllers and therefore to different memory modules, accessing different memory addresses, have associated with them different bandwidth and latency costs that need be taken into account. Hardware prefetchers have a number of (design-time or runtime) configuration settings or parameters that control their behavior. The optimal configuration settings or parameters are dependent on the location (e.g., local vs remote) and/or type (e.g., DDR vs NVM) of the system memory being accessed. Long-latency connections (NVM or remote memory) require the prefetcher to make requests further into the future to ensure the requested data are fetched in time for execution. Low-bandwidth connections, which has a higher penalty cost for wrong prefetches (wasted bandwidth), require the prefetcher to make the more accurate predictions. According to an embodiment, a hardware prefetcher's behavior should be adjusted in accordance to the following guidelines:

Prefetchers should be more aggressive when accessing memory regions with high access latencies, (e.g., launch its requests earlier, stay further ahead of the application's access stream)

Prefetchers should be less aggressive when accessing memory regions with low bandwidth (e.g., issue less prefetch requests, do not fetch too far ahead of the application's access stream)

Given that a single prefetcher will need to generate requests that access different memory addresses and thus different memory regions, a prefetcher should be aware of the regions it will issues prefetches to and adjust its prefetching behavior accordingly. While the discussion below focuses on a stream prefetcher that tracks linear-strided access streams inside a fixed window, aspects of the present invention can be applied to any types of prefetcher.

Stream prefetchers work by monitoring access requests from the processor cores and trying to detect access patterns (linear strides) in order to predict the next memory address to be accessed. As part of the detection, the prefetcher tracks a number different access streams by utilizing one or more data structures such as tables. To keep the size of these table manageable, each of tracked access streams is restricted to a stream window of a fixed size (e.g., 4 KB). When the access pattern in a tracked access stream is detected and confirmed, the prefetcher issues prefetches based on the detected pattern.

A stream prefetcher's behavior (e.g., prefetching aggressiveness) is controlled by a set of prefetch parameters. In one embodiment, these parameters include prefetch distance D, training-to-stable threshold S, and throttle threshold T. The prefetch distance D controls how far ahead in the memory address space from which data may be fetched. When a memory access stream from a processor core is detected, the prefetcher generates requests up to D times the detected stride ahead of the access stream. As such, high latency memory accesses may be overcome by increasing the prefetch distance D.

The training-to-stable threshold S specifies the number of memory accesses exhibiting the same access pattern that must be detected for a particular access stream, before the access can transition from the training state to stable state. Since prefetch requests are issued only when the tracked access streams is in stable state, the training-to-stable threshold controls how long a prefetcher must wait before it can start issuing requests. Increasing the training-to-stable threshold S is one way of making the prefetcher less aggressive and thereby waste less bandwidth.

When bad or missed prefetches are detected, the prefetcher can deactivate the generation of prefetch requests when the number of detected bad prefetches exceeds the throttle threshold T. Thus, by adjusting the throttle threshold T, a prefetcher can be made more tolerant or less tolerant with respect to bad/stale access streams. For prefetching in low-bandwidth regions, the prefetcher can be throttled earlier by decreasing the throttle threshold T, which helps preserving scarce bandwidth.

According to an embodiment of the present invention, each memory access stream tracked by the prefetcher is associated with its own set of prefetch parameters D, S, and T. By varying the value of D, S, and T, the behavior of each memory access stream can be individually adjusted. In one embodiment, the system memory address space is classified into different memory regions or classes based on the NUMA characteristics associated with each memory address in the address space. For instance, addresses that are mapped to local memory may be classified into one memory region while addresses that are mapped to remote memory are classified into another. The NUMA characteristics of each memory address may be affected by the type, location, etc. of the memory module to which the memory address is mapped to.

According to an embodiment, when a prefetcher starts to track a new access stream, it queries a system address decoder (SAD) to determine the number of memory regions that are contained in the stream window for the new access stream. In some embodiments, the SAD contains, or has access to, information on the mapping of the system memory address space to the memory controllers. The SAD may be an existing structure inside each core, or if located elsewhere, such as an off-core or off-socket location, the contents or functions of SAD may be mirrored or duplicated inside the core (e.g., mini-SAD). SAD allows the appropriate memory controller to be addressed given a physical address.

Once the memory regions for a new access stream is determined, the prefetcher may retrieve the corresponding prefetch parameters for each memory region that may be accessed by the access stream. In one embodiment, the configuration table stores a set of prefetcher parameters for each memory region within the system memory address space. The contents of the configuration table may be programmed by the user, operating system, or application. In one embodiment, the configuration table may be programmed through registers such as machine-specific registers (MSRs).

Figure 4:
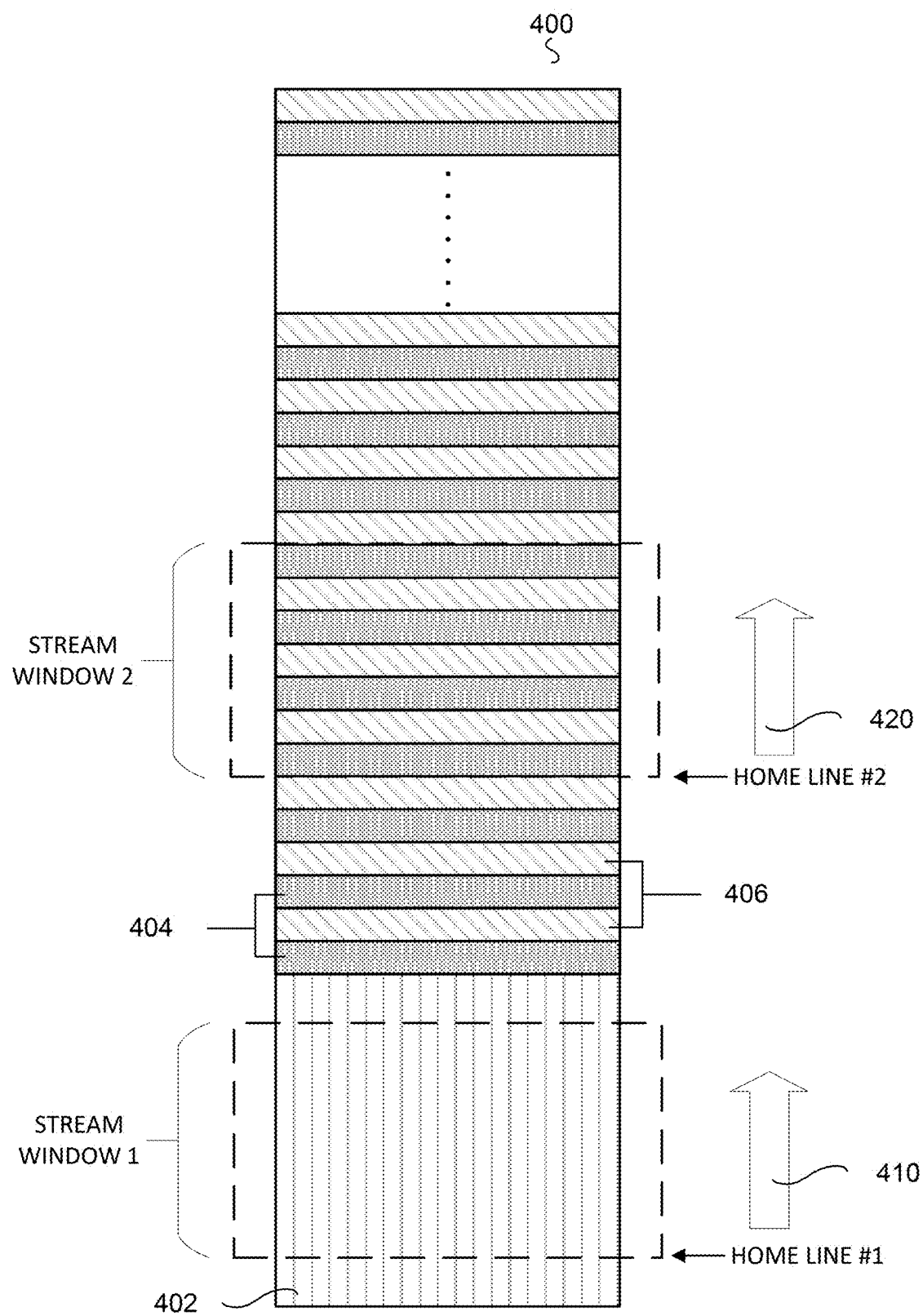
FIG. 4 illustrates different types of access streams with respect to a system memory address space in accordance to an embodiment.

There are two types of access streams that may be tracked by the prefetcher. The first type of access stream includes accesses to memory addresses that are all in the same memory region. One way this may occur is when the stream window is smaller or equal to the interleaving factor. The second type of access stream includes accesses to memory addresses that are in different memory regions. This occurs when the stream window is greater than the interleaving factor, or when the stream window crosses the boundary between two memory regions. FIG. 4 illustrates these two types of access streams. In FIG. 4, a memory address space 400 is mapped to three memory controllers and is thus divided into three memory regions 402, 404, and 406. Each memory region is accessed through its respective memory controller. Furthermore, memory regions 404 and 406 are interleaved in memory address space 400. Two access streams 410 and 420 are tracked by the prefetcher. Access stream 410 begins at home line 1 and monitors access to addresses within stream window 1. Access stream 420 begins at home line 2 and monitors accesses to addresses within stream window 2 and. The direction of the arrow indicates the direction of the access stream. Access stream 410 illustrates the first type of access stream where all of the addresses within stream window 1 are mapped to the same memory controller and therefore belong to the same memory region 402. Access stream 420 illustrates the second type of access stream where each of the addresses within stream window 2 may be mapped to one of two memory controllers and therefore may belong to one of two memory regions 404 and 406. Since different memory regions are associated with different NUMA characteristics, each memory region covered by access stream 420 should be associated with its own set of prefetch parameters. In contrast, access stream 410 requires only one set of prefetch parameters.

As noted above, different memory regions with different NUMA characteristics should be associated with different sets of prefetch parameters. For example:

For high bandwidth memory regions (e.g., addresses mapped to local DRAM):
$D=D_0$, $S=S_0$, $T=T_0$ For medium bandwidth memory regions (e.g., addresses mapped to remote DRAM):
$D=D_1$, $S=S_1$, $T=T_1$ For low bandwidth memory regions (e.g., addresses mapped to NVM):
$D=D_2$, $S=S_2$, $T=T_2$ Access streams that map to the NVM or remote memory can be made less aggressive (wasting less of the lower bandwidth) relatively to local memory by setting $S_2 > S_1 > S_0$. Doing so requires the application to maintain a longer stable stream access pattern accessing the NVM before the prefetcher kicks in. In addition, to overcome the higher latency associated with accessing the NVM and remote memory, once the prefetcher is triggered for these memory types, prefetching requests may be generated further ahead of the application by setting $D_2 > D_1 > D_0$. Finally, an inaccurate prefetcher should be throttled earlier on lower-bandwidth NVM and remote accesses than on accesses to the local memory. To achieve this, the parameters can be set as $T_2 < T_1 < T_0$.

In some embodiments, the actual prefetch distance D is dynamic and increases as streams receive more hits. Thus, in these embodiments, additional parameters may be used. These additional parameters include the initial prefetch distance as a stream goes to stable state, the distance increment on each hit, and the maximum distance. A NUMA-aware prefetcher can be constructed such that has any of these parameters may be set depending on the memory type.

Access Stream Covering a Single Memory Region

For access streams that cover only one memory region, such that all addresses within its stream window are mapped to the same memory controller, only one set of prefetch parameter is needed for each access stream.

FIGS. 5A and 5B show the state through time for two different access streams 510 and 520. Each of the access stream 510 and 520 accesses only addresses that are mapped to a single memory region. The memory region 512 accessed by access stream 510 in FIG. 5A is different from the memory region 522 accessed by access stream 512 from FIG. 5B. Access streams 510 and 520 may overlap in time or occur at different times.

Referring first to FIG. 5A, at time $T_0$, the prefetcher detects a requestor making a request for a cache line with memory address 1000. The requestor may be a core, application, operating system, etc. Assuming the request does not match any existing stream currently being tracked by the prefetcher, an entry for a new stream is created. At this point the SAD is interrogated so the prefetcher knows this stream spans only a single memory region 512. Next, according to an embodiment, the prefetcher retrieves from a configuration table a set of prefetch parameters associated with memory region 512. The prefetcher then assigns to the retrieved prefetch parameters $S_{512}$, $D_{512}$ to stream 510. Accordingly, the training-to-stable threshold S and the prefetch distance D for access stream 510 are both set to 3. The last demand access (1000) is stored as the stream's home line. The stride is unknown at this point. The state is initialized to SEARCHING state.

At time $T_0+1$, a request for address 1001 is generated by the core. This request the stream already present and suggests a stride of 1. This stride is populated in the stream table, the hit counter is incremented, and the state of the streams is transitioned to the TRAINING state. No prefetches can be generated yet as the number of hits is still below the associated training-to-stable parameter $S_{512}$.

At time $T_0+2$, address 1002 is requested by the core. This confirms the stride of 1 and the hit counter is incremented to 2. The state remains in the TRAINING state as the number of hits (now 2) is still below the associated training-to-stable parameter $S_{512}$.

At time $T_0+3$, address 1003 is requested by the core, matching the stride of 1. The hit counter is incremented to 3. As such, stream 510 now transitions into the STABLE state and the prefetcher may now launch prefetches between address 1003 (the last demand access) and 1006 (the last demand access+prefetch distance $D_{512}=3$). Accordingly, the prefetcher issues prefetch requests to fetch addresses 1004, 1005, and 1006 from the downstream memory hierarchy.

At time $T_0+4$ and beyond, prefetcher will each continue issuing new prefetches access stream 510. Each subsequent demand requests that is observed extends the stream window.

In one embodiment, a missed-prefetch detection mechanism implemented by the prefetcher to throttle bad or stale access streams. When a missed-prefetch is detected, a current wrong prefetch fraction F is incremented. In some embodiments, F is decremented when a good prefetch is detected. At each point in time the value of F can be compared against the throttle thresholds parameter $T_{512}$ associated with region 512. When $F>T_{512}$, prefetching for access stream 512 will be suppressed. According to an embodiment, however, the prefetcher will continue to monitor the access requests and responsively update the appropriate parameters. Prefetcher may resume issuing prefetch requests from access stream 520 when F drops below the throttle threshold $T_{512}$.

Referring now to FIG. 5B. It illustrates the state through time for access stream 520, which accesses addresses in a different memory region than access stream 510. At time $T_1$, the prefetcher detects a request for a cache line with memory address 2000. The request may be made by same application that made the request in access stream 510, or a different application. Again, assuming there is no matching stream in the prefetcher, a new entry is created. Next, SAD is interrogated so the prefetcher knows this stream only spans a single memory region 522. Then, the prefetcher queries the configuration table for the prefetch parameters associated with memory region 522 and assigns to the associated prefetch parameter $S_{522}$, $D_{522}$ to stream 520. In this case, the training-to-stable threshold S and the prefetch distance D for access stream 520 are set to 4 and 5, respectively. The last demand access (2000) is stored as the home line for access stream 520. The stride is unknown at this point and therefore not et. The state is initialized to SEARCHING state.

From $T_1+1$ to $T_1+3$, requests for addresses 2002, 2004, and 2006 are detected by the prefetcher suggesting a stride of 2. The hits are updated accordingly. The tracked access stream remains in the training state as the number of hits (3) is below the training-to-stable threshold for region 522 (4).

At $T_1+4$, a request for address 2008 is detected. The stream now transitions into stable state and the prefetcher issues prefetches between address 2008 (the last demand access) and 2018 (the last demand access+stride×prefetch distance $D_{522}=2008+2\times5=2018$). As a result, cache lines in addresses 2010, 2012, 2014, 2016, and 2018 are fetched. From that point on, the prefetcher will continue issue new prefetches for access stream 520 until the stream is throttled according to the throttle threshold $T_{522}$.

Access Stream Covering Multiple Memory Regions

When a single stream accesses addresses that map to more than one memory region, according to an embodiment, the stream prefetcher algorithm is extended to support multiple sets of prefetch parameters for that stream. In one embodiment, a sub-stream is created for each of the multiple memory region in the stream and each sub-stream receives the prefetch parameters (e.g., S, D, and T) associated for the corresponding memory region. In addition, a set of state information will be kept for each sub-stream. According an embodiment, for state information that are the same or shared across different sub-streams, only one copy will be kept. For instance, the home line address, detected stride, and hit counter shared between different sub-streams and thus only one copy of such information needs to be kept by the prefetcher. Other state information, such as the training state of the stream (TRAINING vs STABLE) and last prefetched address which are different for each sub-stream, should be kept separately for each sub-stream. The sub-streams that are created can each generate prefetch requests, provided that they are in STABLE state. Each sub-stream may generate prefetch requests for each address starting from the home line and up the maximum distance D specified by the parameter associated with the sub-stream, while skipping over those addresses that belong to other memory regions which are tracked by other sub-streams.

FIG. 6 shows an example of the states tracked by a stream prefetcher through time for a stream that accesses multiple memory regions. For simplicity, only two memory regions are shown in the example. It should be appreciated, however, that the same approach is applicable irrespective to the number of memory regions that are accessed by the stream. As illustrated, access stream 600 access addresses that span two memory regions 610 and 620. Each of the memory regions is associated with different NUMA characteristics. For example, memory region 612 may contain addresses that are mapped to local memory while memory region 614 may contain addresses that are mapped to remote memory. Memory region 612 is associated with prefetch parameters $S_{612}=3$, $D_{612}=3$ and memory region 614 is associated with prefetch parameters $S_{614}=4$, $D_{614}=5$. The interleaving factor is set to 1 for stream 610, such that even address lines are mapped to memory region 612 while odd lines mapped to memory region 614.

At time $T_3$, the prefetcher detects a request for a line with address 3000. There is no matching stream in the prefetcher so a new entry is created. According to an embodiment, the SAD is interrogated so the prefetcher knows this stream spans two memory regions 612 and 614. The prefetcher then assigns the relevant prefetching parameters $S_{612}$, $D_{612}$, $S_{614}$, and $D_{614}$ to the appropriate sub-streams. The last demand access (3000) is stored as the home line which is shared by both sub-streams. The stride is unknown and thus not set. Both sub-streams are initialized to the SEARCHING state.

At time $T_3+1$, a request for address 3001 is detected by the prefetcher. This request matches the stream already present and suggests a stride of 1. This stride is populated in the stream table. The hit counter is incremented. Both sub-streams transition to the TRAINING state. No prefetch requests is generated by either sub-stream as the number of hits is still below the training-to-table parameter values for both sub-streams. At time $T_3+2$, address 3002 is requested which confirms the stride of 1. The hit counter is incremented to 2. Again, no prefetch requests are generated because neither sub-streams are active.

At time $T_3+3$, the hit counter reaches 3. As such, the sub-stream for region 612 transitions from TRAINING to STABLE state because $S_{612}=3$. This sub-stream can now issue prefetches for addresses between 3003 (the last demand access) and 3006 (3000 plus the distance $D_{612}=3$). These prefetches may be issues over several subsequent clock cycles. Addresses that do not belong to the sub-stream's memory region, however, are skipped over. As a result, only the prefetch requests for addresses 3004 and 3006 are issued to the downstream memory hierarchy. Address 3005 is skipped over because it belongs to a different memory region (i.e., memory region 614).

At time $T_3+4$, the sub-stream for region 612 can issue prefetch requests for addresses up to 3007 (3004+3=3007). The last prefetch field is updated accordingly so the sub-stream can keep track of its progress. However, no new prefetch requests are generated because address 3007 belongs to memory region 614 rather than 612. Up to this point, the sub-stream for memory region 614 has stayed in the TRAINING state as the hit counter remained below the training-to-stable threshold for memory region 614 ($S_{614}=5$).

At time $T_3+5$, the sub-stream for memory region 612 issues its next prefetch for address 3008. On the other hand, the sub-stream for memory region 614 now transitions from TRAINING to STABLE state and starts issuing prefetches from the last demand access 3005 up to a distance of 5 addresses away (stride=1*$D_{513}$=5). As such, it will issue prefetch requests over the next several clock cycles for addresses 3007 and 3009. From that point on, both sub-streams are in stable state and will each continue issuing new prefetches for their own memory region. Moreover, as more access requests are observed, the stream window gets extended.

As noted above, if a missed-prefetch detection mechanism is used to provide throttle for bad or stale access streams, at each point in time, the current wrong prefetch fraction F is compared against both thresholds $T_{612}$ and $T_{614}$. When F>$T_{612}$, prefetches from the sub-stream for memory region 612 will be suppressed. On the other hand, when F>$T_{614}$, prefetches from the sub-stream for memory region 614 will be suppressed. As with before, the prefetch state will continue to be updated when access requests are detected. The prefetcher can restart a sub-stream when F drops below the throttle threshold for that sub-stream.

Figure 7:
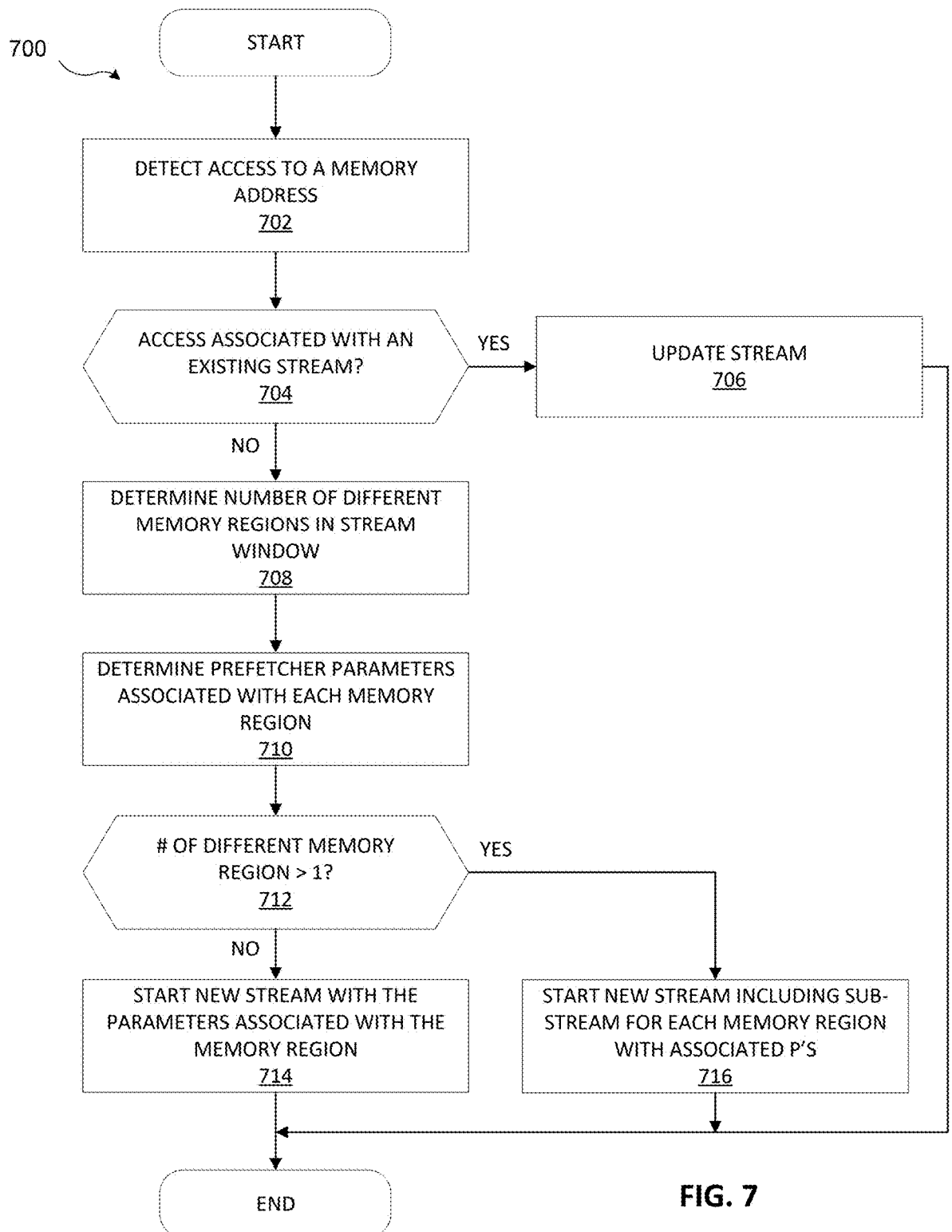
FIG. 7 is a flow diagram illustrating a method embodiment of the present invention.

FIG. 7 is a flow diagram for an embodiment of a method that may be implemented and/or performed by a prefetcher. The method begins at the start block. At block 702, an access to a memory address is detected. The access may be a demand request or a miss. Next, at block 704, a determination is made on whether the access is associated with an existing stream that is currently being tracked and if so, at block 706, the appropriate values kept for the existing stream is updated. For instance, the value for fields such as the home line, stride, hits, state, and last prefetch address may be updated. If the access is a miss, the current wrong prefetch fraction F may be updated. In one embodiment, the updates are made to the values kept for the stream as well as the associated sub-streams. Referring back to block 704, if it is determined that the detected access is not associated with any existing stream, then at block 708, the prefetcher determines how many different memory regions are within the stream window for the detected access. In one embodiment, the prefetcher queries and receive this information from the SAD based on the memory address. At block 710, the prefetcher determines the prefetcher parameters that are associated with each memory region within the stream window. The prefetcher may, according to an embodiment, retrieve this information from an internal or external configuration table. A block 712, a determination is made on whether there are more than one memory regions in the stream window. At block 714, if there is only one memory region is in the stream window, the prefetcher creates a new stream with the prefetch parameters associated with that memory region (see, e.g., the access streams in FIGS. 5A-5B). If, however, the stream window spans multiple memory regions, then at block 716, the prefetcher creates a new stream that includes a sub-stream for each of the memory regions. Each sub-stream is associated with the prefetch parameters for a respective memory region (see, e.g., the access stream in FIG. 6).

An example of the present invention is an apparatus that includes a system memory to store data and a cache to store data received from the system memory. The system memory may include multiple memory regions each of which is associated with its own set of prefetch parameters. At least one of the memory regions may have a prefetch parameter value that is different than a corresponding prefetch parameter value of another one of the memory regions. The apparatus may also include a prefetcher to monitor data accesses to the cache and to generate one or more prefetch requests to fetch data from the system memory to the cache. The one or more prefetch requests may be generated based on the monitored data accesses and the set of prefetch parameters associated with the memory region from which data is to be fetched. The memory regions may include at least a first memory region of a first memory type and a second memory region of a second memory type, the first and the second memory type may be different memory types. The first memory region may be a local memory and the second memory region may be a remote memory, or vice versa. The prefetcher may be a stream prefetcher and the set of prefetcher parameters may include prefetch distance, training-to-stable threshold, and throttle threshold. The values of the set of prefetcher parameters associated with each respective memory region may be set, at least in part, based on one or more memory access characteristics for the respective memory region. The one or more memory access characteristics may include access latency and/or access bandwidth. The prefetcher may detect an incoming data access request to access data in the cache. It may also determine that the incoming data access request does not correspond to any existing streams tracked by the prefetcher and that more than one memory regions fall within a stream window. The stream window may be determined based on a memory address of the incoming data access request and a stream window size. The prefetcher may create a new stream and the new stream may include a sub-stream for each memory region that falls within the stream window. Each sub-stream may correspond to a respective memory region and be associated with the set of prefetch parameters associated with that memory region. The prefetcher may also determine that the incoming data access request corresponds to an existing stream tracked by the prefetcher, and responsively update one or more states associated with the existing stream using information in the incoming data access request. The prefetcher may issue one or more prefetch requests when an updated state exceeds a threshold specified by the set of prefetch parameters associated with the existing stream.

Another example of the present invention is a method implemented in a computer processor. The method includes storing data in a system memory. The system memory may include multiple memory regions each of which is associated with its own set of prefetch parameters. At least one of the memory regions may have a prefetch parameter value that is different than a corresponding prefetch parameter value of another one of the memory regions. The method may further include monitoring data accesses to a cache and generating one or more prefetch requests to fetch data from the system memory to the cache. The one or more prefetch requests may be generated based on the monitored data accesses to the cache and the set of prefetch parameters associated with the memory region from which data is to be fetched. The memory regions may include at least a first memory region that consists of a first memory type and a second memory region that consists of a second memory type. The first memory type and the second memory type may be different memory types. The first memory region may be a local memory and the second memory region may be a remote memory, or vice versa. The prefetcher may be a stream prefetcher and the set of prefetcher parameters may include prefetch distance, training-to-stable threshold, and throttle threshold. The method may further include setting values for a set of prefetch parameters associated with a first memory region. These values may be based, at least in part, on one or more memory access characteristics of the first memory region. The one or more memory access characteristics may include access latency and/or access bandwidth. The method may further include detecting an incoming data access request to access data in the cache; determining the incoming data access request does not correspond to any existing streams currently being tracked; determining that more than one memory regions fall within a stream window; and creating a new stream. The stream window may be determined based on a memory address of the incoming data access request and a stream window size. The new stream may include a sub-stream for each memory region that falls within the stream window. Each sub-stream may correspond to a respective memory region and be associated with a set of prefetch parameters associated with the respective memory region. The method may further include determining that the incoming data access request corresponds to an existing stream tracked by the prefetcher; updating one or more states associated with the existing stream using information in the incoming data access request; and issuing one or more prefetch requests when an updated state exceeds a threshold specified by the set of prefetch parameters associated with the existing stream.

Yet another example of the present invention is a system that includes one or more processor cores to execute instructions and operate on data, a system memory to store data, and a cache to store data received from the system memory for use by the one or more processor cores. The system memory may include multiple memory regions each of which is associated with its own set of prefetch parameters. At least one of the memory regions has a prefetch parameter value that is different than a corresponding prefetch parameter value of another one of the memory regions. The system may also include a prefetcher to monitor data accesses to the cache and to generate one or more prefetch requests to fetch data from the system memory to the cache. The one or more prefetch requests may be generated based on the monitored data accesses and the set of prefetch parameters associated with the memory region from which data is to be fetched. The memory regions may include at least a first memory region of a first memory type and a second memory region of a second memory type, the first and the second memory type being different memory types. The first memory region may be a local memory and the second memory region may be a remote memory, or vice versa. The prefetcher may be a stream prefetcher and the set of prefetcher parameters may include prefetch distance, training-to-stable threshold, and throttle threshold. The values of the set of prefetcher parameters associated with each respective memory region may be set, at least in part, based on one or more memory access characteristics for the respective memory region. The one or more memory access characteristics may include access latency and/or access bandwidth. The prefetcher may detect an incoming data access request to access data in the cache. It may also determine that the incoming data access request does not correspond to any existing streams tracked by the prefetcher and that more than one memory regions fall within a stream window. The stream window may be determined based on a memory address of the incoming data access request and a stream window size. The prefetcher may create a new stream and the new stream may include a sub-stream for each memory region that falls within the stream window. Each sub-stream may correspond to a respective memory region and be associated with the set of prefetch parameters associated with that memory region. The prefetcher may also determine that the incoming data access request corresponds to an existing stream tracked by the prefetcher, and responsively update one or more states associated with the existing stream using information in the incoming data access request. The prefetcher may issue one or more prefetch requests when an updated state exceeds a threshold specified by the set of prefetch parameters associated with the existing stream.

An additional example of the present invention is a computer- or machine-readable medium having code or program stored thereon which, when executed by the computer or machine, cause the computer or machine to perform a series of operations that includes storing data in a system memory, monitoring data accesses to a cache, and generating one or more prefetch requests to fetch data from the system memory to the cache. The system memory may include multiple memory regions each of which is associated with its own set of prefetch parameters. At least one of the memory regions may have a prefetch parameter value that is different than a corresponding prefetch parameter value of another one of the memory regions. The one or more prefetch requests may be generated based on the monitored data accesses to the cache and the set of prefetch parameters associated with the memory region from which data is to be fetched. The memory regions may include at least a first memory region that consists of a first memory type and a second memory region that consists of a second memory type. The first memory type and the second memory type may be different memory types. The first memory region may be a local memory and the second memory region may be a remote memory, or vice versa. The prefetcher may be a stream prefetcher and the set of prefetcher parameters may include prefetch distance, training-to-stable threshold, and throttle threshold. The series of operations may further include setting values for a set of prefetch parameters associated with a first memory region. These values may be based, at least in part, on one or more memory access characteristics of the first memory region. The one or more memory access characteristics may include access latency and/or access bandwidth. The series of operations may further include detecting an incoming data access request to access data in the cache; determining the incoming data access request does not correspond to any existing streams currently being tracked; determining that more than one memory regions fall within a stream window; and creating a new stream. The stream window may be determined based on a memory address of the incoming data access request and a stream window size. The new stream may include a sub-stream for each memory region that falls within the stream window. Each sub-stream may correspond to a respective memory region and be associated with a set of prefetch parameters associated with the respective memory region. The series of operations may also include determining that the incoming data access request corresponds to an existing stream tracked by the prefetcher; updating one or more states associated with the existing stream using information in the incoming data access request; and issuing one or more prefetch requests when an updated state exceeds a threshold specified by the set of prefetch parameters associated with the existing stream.

Figure 8:
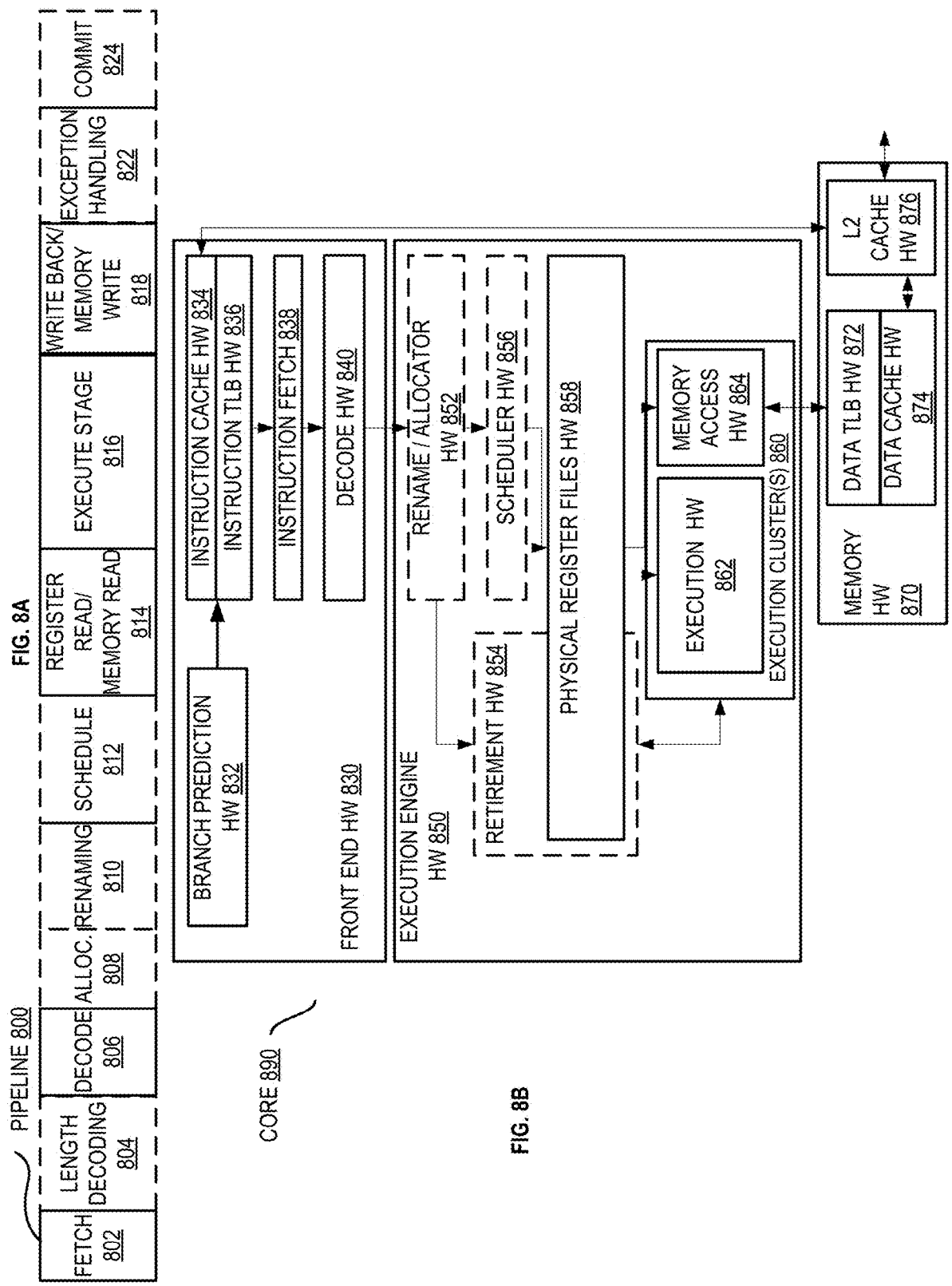
FIG. 8A is a block diagram illustrating both an exemplary in-order pipeline and an exemplary register renaming, out-of-order issue/execution pipeline according to embodiments of the invention.
FIG. 8B is a block diagram illustrating both an exemplary embodiment of an in-order architecture core and an exemplary register renaming, out-of-order issue/execution architecture core to be included in a processor according to embodiments of the invention.

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end hardware 830 coupled to an execution engine hardware 850, and both are coupled to a memory hardware 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end hardware 830 includes a branch prediction hardware 832 coupled to an instruction cache hardware 834, which is coupled to an instruction translation lookaside buffer (TLB) 836, which is coupled to an instruction fetch hardware 838, which is coupled to a decode hardware 840. The decode hardware 840 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode hardware 840 or otherwise within the front end hardware 830). The decode hardware 840 is coupled to a rename/allocator hardware 852 in the execution engine hardware 850.

The execution engine hardware 850 includes the rename/allocator hardware 852 coupled to a retirement hardware 854 and a set of one or more scheduler hardware 856. The scheduler hardware 856 represents any number of different schedulers, including reservations stations, central instruction window, etc. The scheduler hardware 856 is coupled to the physical register file(s) hardware 858. Each of the physical register file(s) hardware 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 858 comprises a vector registers hardware, a write mask registers hardware, and a scalar registers hardware. This register hardware may provide architectural vector registers, vector mask registers, and general purpose registers. The physical register file(s) hardware 858 is overlapped by the retirement hardware 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 854 and the physical register file(s) hardware 858 are coupled to the execution cluster(s) 860. The execution cluster(s) 860 includes a set of one or more execution hardware 862 and a set of one or more memory access hardware 864. The execution hardware 862 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 856, physical register file(s) hardware 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 864). It should also be understood that where separate pipelines are used, one or more of these pipelines may be out-of-order issue/execution and the rest in-order.

The set of memory access hardware 864 is coupled to the memory hardware 870, which includes a data TLB hardware 872 coupled to a data cache hardware 874 coupled to a level 2 (L2) cache hardware 876. In one exemplary embodiment, the memory access hardware 864 may include a load hardware, a store address hardware, and a store data hardware, each of which is coupled to the data TLB hardware 872 in the memory hardware 870. The instruction cache hardware 834 is further coupled to a level 2 (L2) cache hardware 876 in the memory hardware 870. The L2 cache hardware 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode hardware 840 performs the decode stage 806; 3) the rename/allocator hardware 852 performs the allocation stage 808 and renaming stage 810; 4) the scheduler hardware 856 performs the schedule stage 812; 5) the physical register file(s) hardware 858 and the memory hardware 870 perform the register read/memory read stage 814; the execution cluster 860 perform the execute stage 816; 6) the memory hardware 870 and the physical register file(s) hardware 858 perform the write back/memory write stage 818; 7) various hardware may be involved in the exception handling stage 822; and 8) the retirement hardware 854 and the physical register file(s) hardware 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 834/874 and a shared L2 cache hardware 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
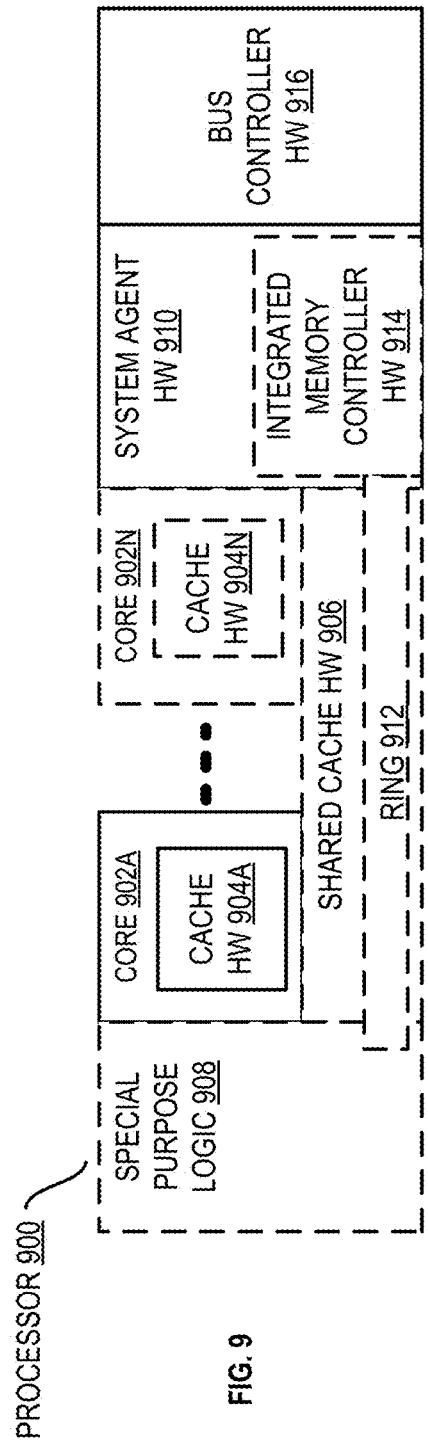
FIG. 9 is a block diagram of a single core processor and a multicore processor with integrated memory controller and graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller hardware 916, while the optional addition of the dashed lined boxes illustrates an alternative processor 900 with multiple cores 902A-N, a set of one or more integrated memory controller hardware 914 in the system agent hardware 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 906, and external memory (not shown) coupled to the set of integrated memory controller hardware 914. The set of shared cache hardware 906 may include one or more mid-level caches, such as level 2 (L2), level 3 (L3), level 4 (L4), or other levels of cache, a last level cache (LLC), and/or combinations thereof. While in one embodiment a ring based interconnect hardware 912 interconnects the integrated graphics logic 908, the set of shared cache hardware 906, and the system agent hardware 910/integrated memory controller hardware 914, alternative embodiments may use any number of well-known techniques for interconnecting such hardware. In one embodiment, coherency is maintained between one or more cache hardware 906 and cores 902-A-N.

In some embodiments, one or more of the cores 902A-N are capable of multi-threading. The system agent 910 includes those components coordinating and operating cores 902A-N. The system agent hardware 910 may include for example a power control unit (PCU) and a display hardware. The PCU may be or include logic and components needed for regulating the power state of the cores 902A-N and the integrated graphics logic 908. The display hardware is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set. In one embodiment, the cores 902A-N are heterogeneous and include both the "small" cores and "big" cores described below.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
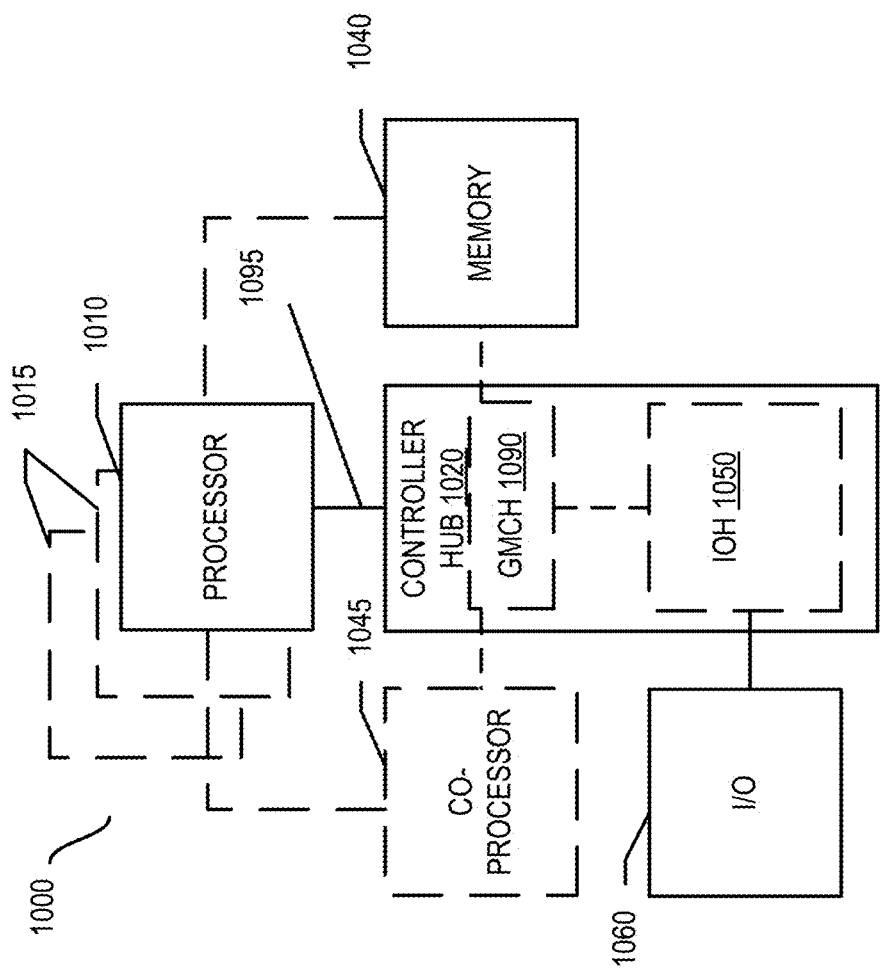
FIG. 10 illustrates a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface, or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor (s) 1045 accept and execute the received coprocessor instructions.

Figure 11:
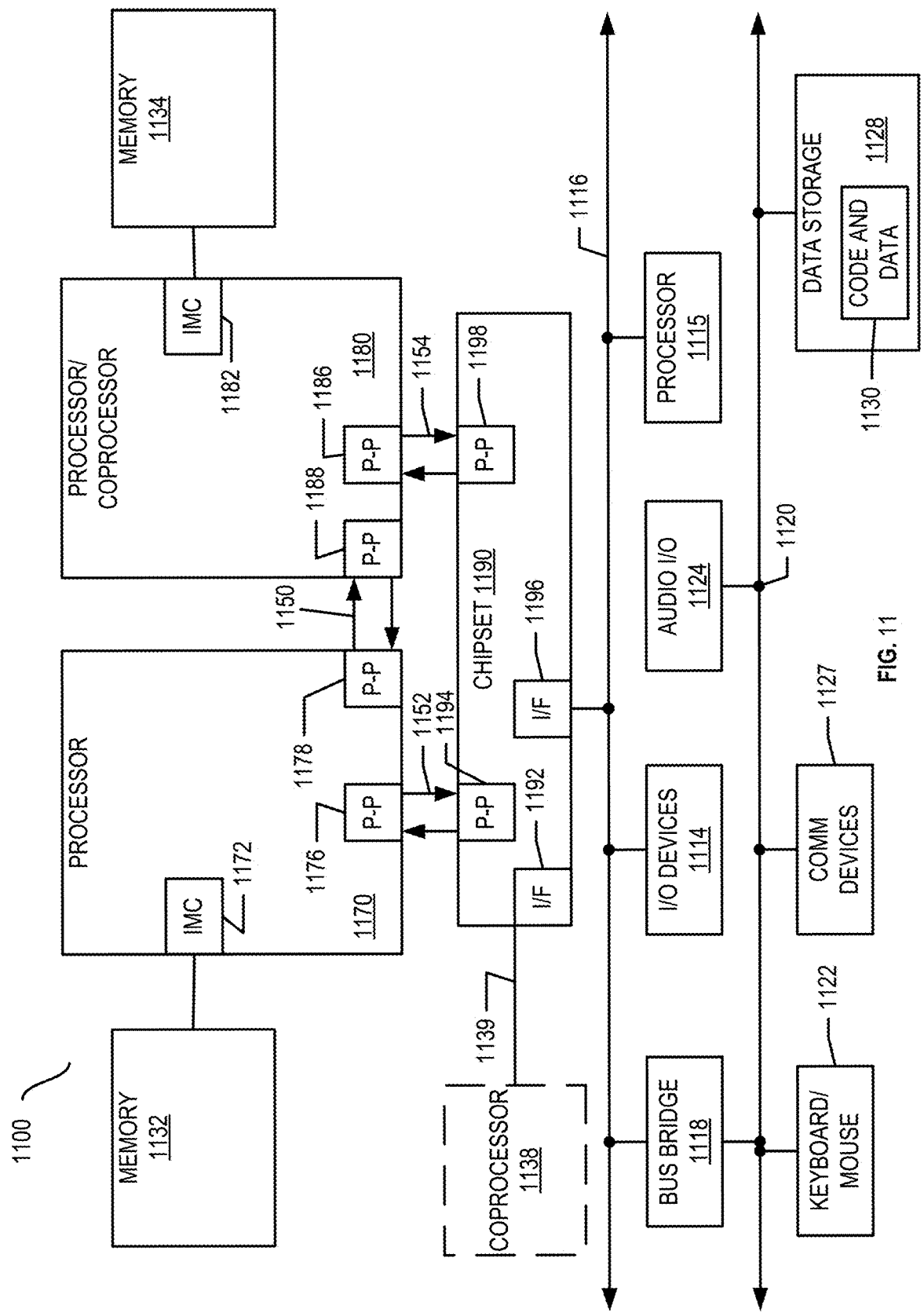
FIG. 11 illustrates a block diagram of a second system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) hardware 1172 and 1182, respectively. Processor 1170 also includes as part of its bus controller hardware point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) hardware), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage hardware 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
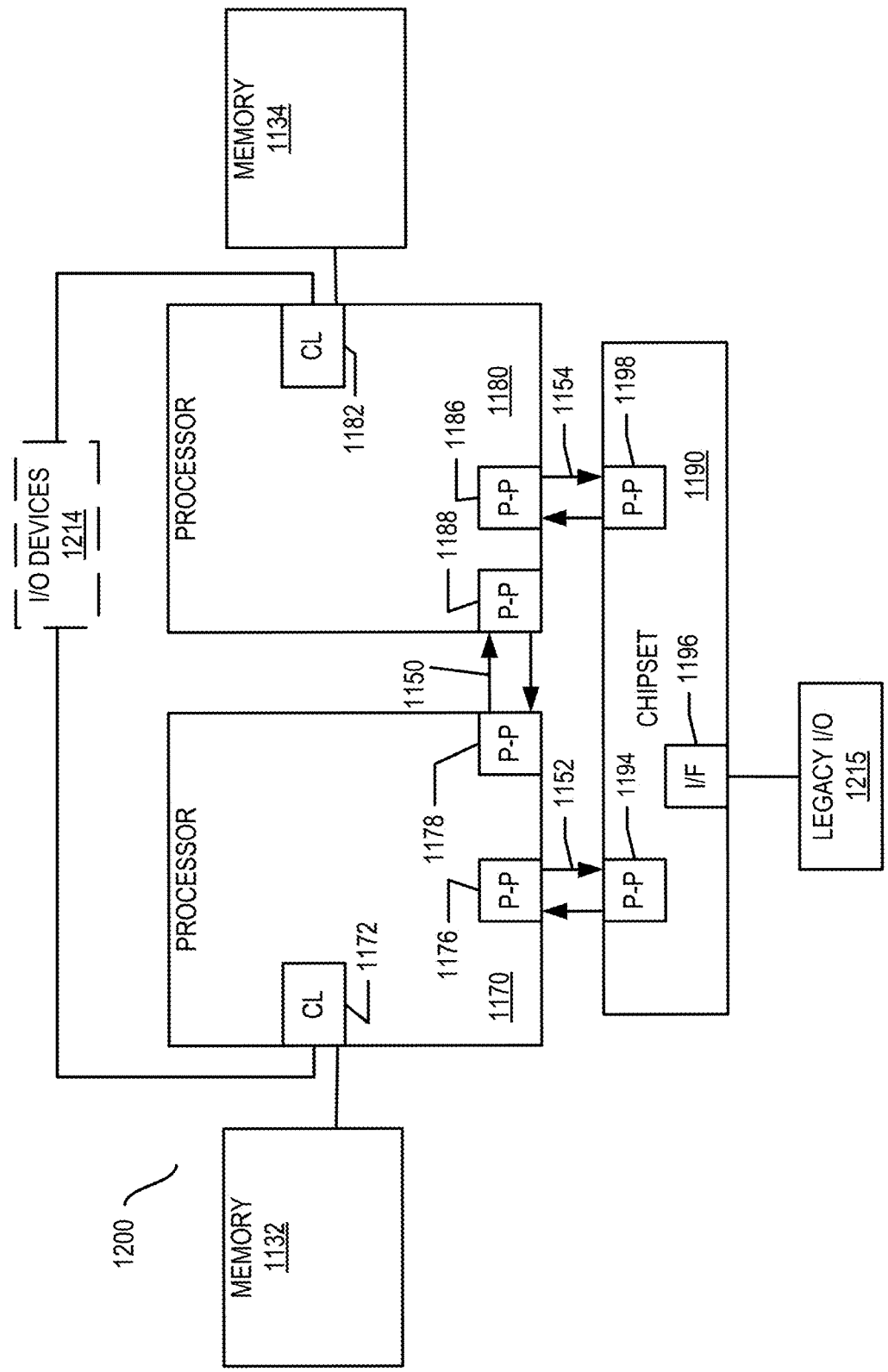
FIG. 12 illustrates a block diagram of a third system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller hardware and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
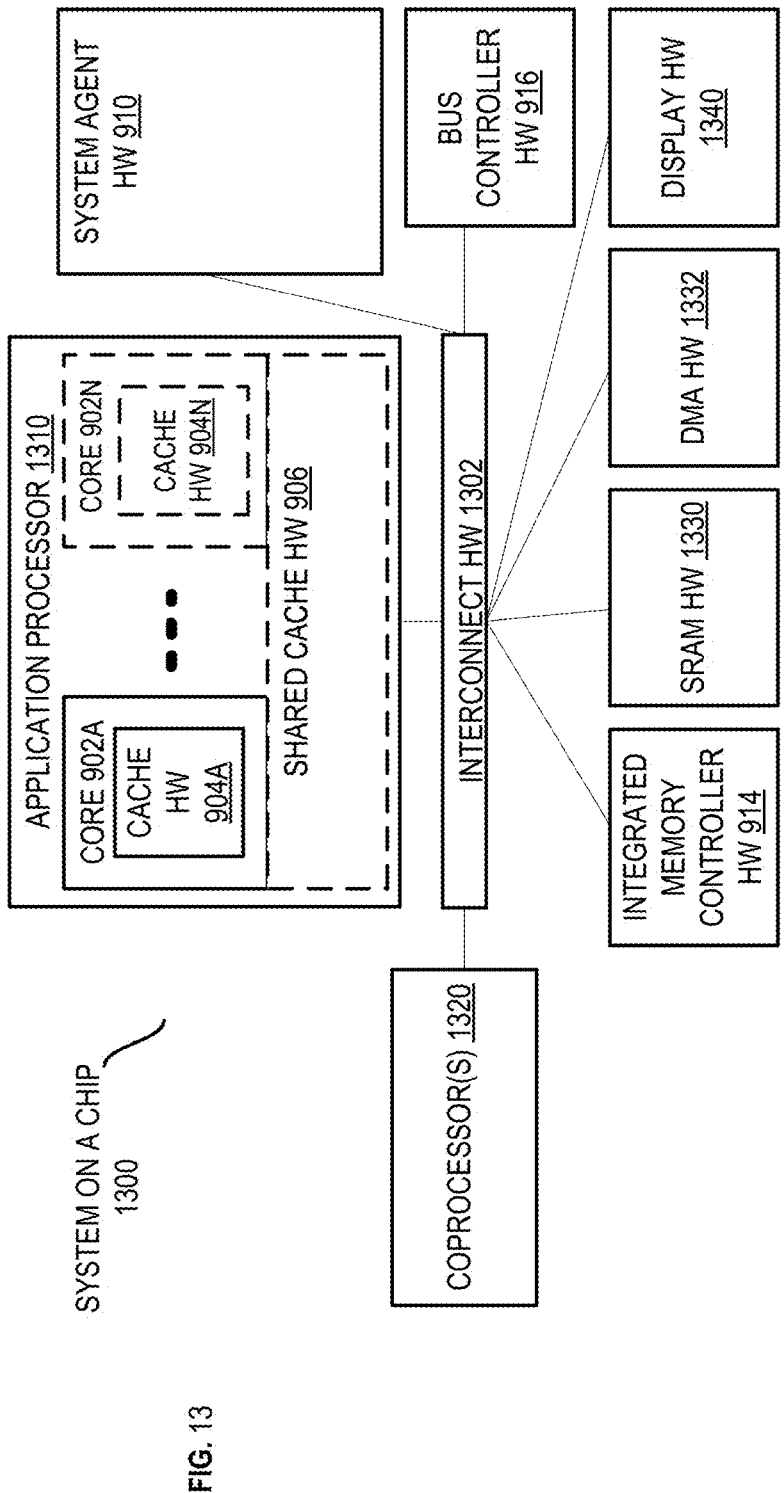
FIG. 13 illustrates a block diagram of a system on a chip (SoC) in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect hardware 1302 is coupled to: an application processor 1310 which includes a set of one or more cores 902A-N and shared cache hardware 906; a system agent hardware 910; a bus controller hardware 916; an integrated memory controller hardware 914; a set or one or more coprocessors 1320 which may include integrated graphics logic, an image processor, an audio processor, and a video processor; an static random access memory (SRAM) hardware 1330; a direct memory access (DMA) hardware 1332; and a display hardware 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   detecting a first request to access data at a first memory address;
   determining a stream window based on the first memory address and a window size, the stream window spanning two or more memory regions of a system memory, the two or more memory regions including a first memory region associated with a first set of prefetch parameter values and a second memory region associated with a second set of prefetch parameter values;
   creating a first prefetch stream and a second prefetch stream based on respective first and second sets of prefetch parameter values;
   prefetching a first set of data from the first memory region based on the first prefetch stream; and
   storing the first set of data in a cache.

2. The method of claim 1, further comprising:
   prefetching a second set of data from the second memory region based on the second prefetch stream; and
   storing the second set of data in the cache.

3. The method of claim 1, wherein the first set of prefetch parameter values is different from the second set of prefetch parameter values.

4. The method of claim 1, wherein the first memory region is of a first memory type and the second memory region is of a second memory type that is different than the first memory type.

5. The method of claim 1, wherein the first memory region comprises a local memory and the second memory region comprises a remote memory.

6. The method of claim 1, wherein the first and second sets prefetch parameter values include values for prefetch distance, training-to-stable threshold, and throttle threshold.

7. The method of claim 6, wherein the training-to-stable threshold is to indicate a number of memory accesses that must be detected before prefetch requests are issued.

8. The method of claim 1, further comprising setting the first and second sets of prefetch parameter values based on respective memory access characteristics of the first and second memory regions.

9. The method of claim 8, wherein the memory access characteristics comprise an access latency.

10. The method of claim 8, wherein the memory access characteristics comprise an access bandwidth.

11. The method of claim 1, further comprising:
    detecting a second request to access data in the cache, the second request corresponding to an existing prefetch stream;
    updating one or more states associated with the existing prefetch stream based on information associated with the second request; and
    issuing one or more prefetch requests based on the updated one or more states associated with the existing prefetch stream.

12. An apparatus comprising:
    a cache communicatively coupled to a system memory, the system memory comprising a plurality of memory regions; and
    a prefetcher to:
      detect a first request to access data at a first memory address;
      determine a stream window based on the first memory address and a window size, the stream window spanning two or more memory regions of the system memory, the two or more memory regions including a first memory region associated with a first set of prefetch parameter values and a second memory region associated with a second set of prefetch parameter values;
      create a first prefetch stream and a second prefetch stream based on respective first and second sets of prefetch parameter values;

prefetch a first set of data from the first memory region based on the first prefetch stream; and
store the first set of data in the cache.

13. The apparatus of claim 12, wherein the prefetcher is further to:
prefetch a second set of data from the second memory region based on the second prefetch stream; and
store the second set of data in the cache.

14. The apparatus of claim 12, wherein the first set of prefetch parameter values is different from the second set of prefetch parameter values.

15. The apparatus of claim 12, wherein the first memory region is of a first memory type and the second memory region is of a second memory type that is different than the first memory type.

16. The apparatus of claim 12, wherein the first memory region comprises a local memory and the second memory region comprises a remote memory.

17. The apparatus of claim 12, wherein the first and second sets prefetch parameter values include values for prefetch distance, training-to-stable threshold, and throttle threshold.

18. The apparatus of claim 17, wherein the training-to-stable threshold is to indicate a number of memory accesses that must be detected before prefetch requests are issued.

19. The apparatus of claim 12, wherein the first and second sets of prefetch parameter values are based on respective memory access characteristics of the first and second memory regions.

20. The apparatus of claim 19, wherein the memory access characteristics comprise an access latency.

21. The apparatus of claim 19, wherein the memory access characteristics comprise an access bandwidth.

22. The apparatus of claim 12, wherein the prefetcher is further to:
detect a second request to access data, the second request corresponding to an existing prefetch stream;
update one or more states associated with the existing prefetch stream based on information in the second request; and
issue one or more prefetch requests based on the updated one or more states associated with the existing prefetch stream.

* * * * *